UNITED STATES PATENT OFFICE.

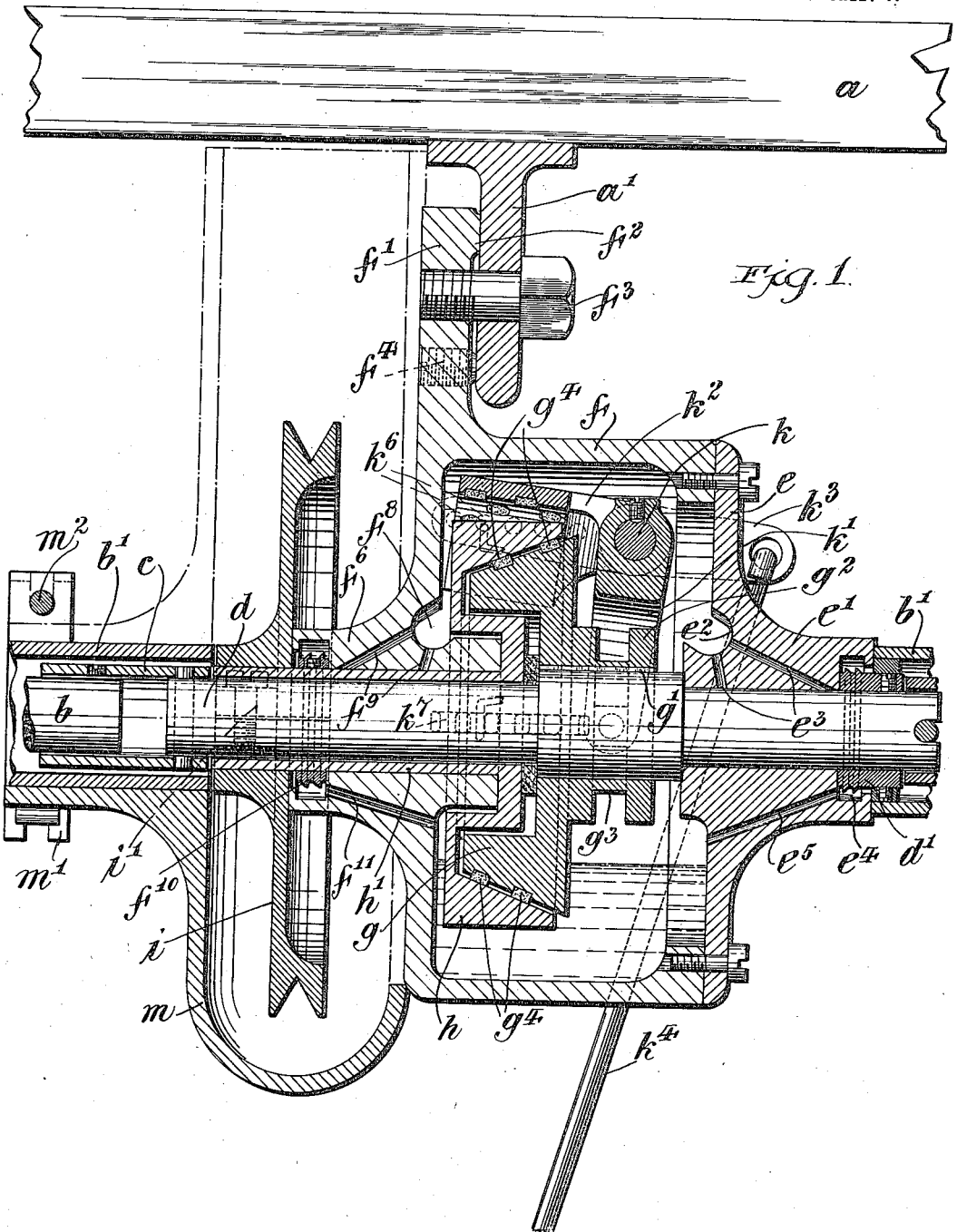

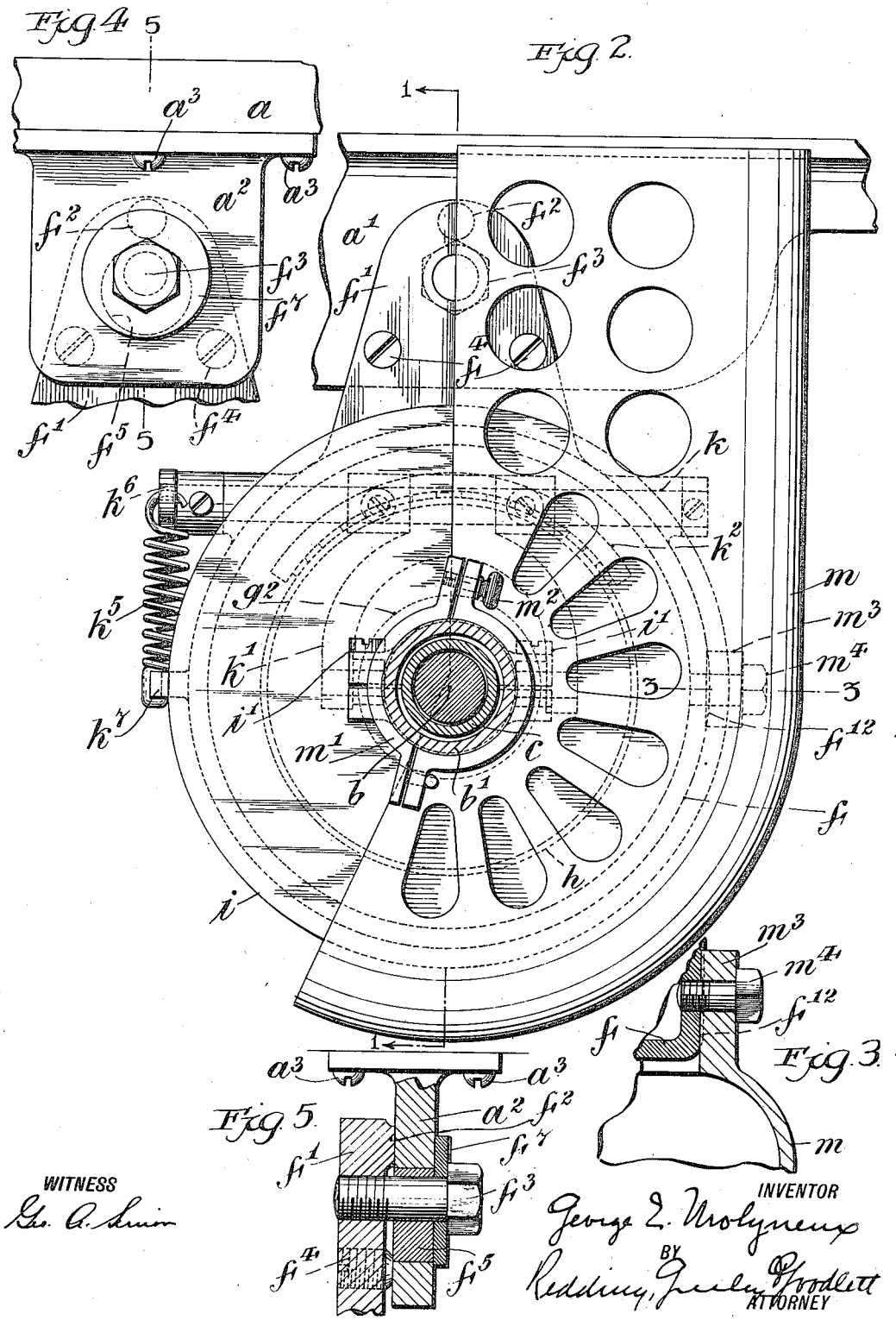

GEORGE E. MOLYNEUX, OF BAYONNE, NEW JERSEY.

TRANSMISSION FOR POWER TABLE SEWING-MACHINES, &c.

1,230,919.  Specification of Letters Patent.  Patented June 26, 1917.

Application filed July 22, 1915. Serial No. 41,227.

*To all whom it may concern:*

Be it known that I, GEORGE E. MOLYNEUX, a citizen of the United States, residing in Bayonne, Hudson county, State of New Jersey, have invented certain new and useful Improvements in Transmissions for Power Table Sewing-Machines, &c., of which the following is a specification, reference being had to the accompanying drawings, forming a part hereof.

In factories in which many sewing machines or other like machines are employed it is usual to mount many machines in line on a common table and to drive all of them from a common drive shaft through transmission devices which permit each machine to be stopped and started independently of the others. Moreover, as the machines are driven at high speed it is usual to provide devices whereby a brake is applied to each machine as it is disconnected from the driving shaft. Usually the drive shaft is a single, continuous shaft and the driving contact is secured through endwise pressure between the members of a friction driving clutch in each transmission, one member being secured to the continuous driving shaft, so that when all or a larger number of the machines are in operation the endwise thrust of the drive shaft is considerable. Moreover, the brake is usually applied by a spring when the clutch is opened and there are no provisions whereby the tension of the spring can be adjusted from time to time, either to compensate for relaxation of the spring or to accommodate differences in the machines or in the work performed thereon. Again, such transmission usually required frequent oiling and through carelessness in supplying the oil or through throwing or creeping of the oil, oil is to be found on the outside of the transmission, where the goods may come in contact with it and become soiled. Furthermore, it has not been easy to replace the driving pulley on the shaft by another for the purpose of changing the speed of the machine. With some transmissions, it has been necessary also to exercise great care in properly alining the parts. It is the object of this invention to produce an improved transmission, specially designed for the use referred to, which shall be free from all of the objections noted, shall be entirely self-contained, shall have all of its parts except the driving pulley completely inclosed, shall comprise within itself an oil chamber, shall be capable of application to any power-table as a unit complete in itself, shall not require a continuous driving shaft, shall not require great accuracy in alinement, and shall permit ready adjustment of the brake spring and easy replacement of the driving pulley. The invention will be more fully explained hereinafter with reference to the accompanying drawings in which it is illustrated and in which—

Figure 1 is a view showing a portion of a power-table for sewing machines with a portion of the drive shaft and with the improved transmission in longitudinal section, the plane of section being indicated by the broken line 1—1 of Fig. 2.

Fig. 2 is a view in end elevation of the transmission, with the dress guard in position, the drive shaft, coupling and guard sleeve being shown in section.

Fig. 3 is a detail view in section illustrating the manner of securing the dress shield to the casing.

Fig. 4 is a detail view illustrating the devices for securing the transmission to any table, the same being a slight modification of the corresponding devices shown in Figs. 1 and 2.

Fig. 5 is a detail view in section on the plane indicated by the line 5—5 of Fig. 4.

The power-table, so called, on which are mounted the several sewing machines to be driven through the transmission from the common drive shaft, is indicated at $a$. Supported in suitable bearings below the table $a$ is the sectional drive shaft $b$, each section being inclosed in an ordinary guard sleeve $b'$ and connected, at each end, through a somewhat flexible, sleeve coupling $c$ of usual character, with the proximate end of the adjacent transmission shaft $d$.

At one end the transmission shaft $d$ floats or rotates loosely in the sleeve hereinafter referred to, and at the other end has a bearing in the hub $e'$ of the cover plate $e$ of a casing which completely incloses the clutch and brake and constitutes a closed oil receptacle. The other member $f$ of this casing is provided with a lug $f'$ by which the complete transmission can be secured to the underside of the power-table $a$, as to a T-beam $a'$ of a specially constructed table, or to a bracket $a^2$ which may be secured by screws $a^3$ to the underside of an old table, as shown in Figs. 4 and 5. In order to permit easy adjustment of the transmission it is preferably secured to the beam $a'$ or the bracket $a^2$ by the devices shown in the drawings. The lug $f'$ has at its upper end a slight projection $f^2$ to bear against the side of the beam or bracket and is secured to such beam or bracket by a single bolt $f^3$ which passes through the beam or bracket and is threaded into the lug. This single bolt permits the transmission to be swung in a plane transverse to the driving shaft, to secure proper alinement, and two bearing screws $f^4$, threaded in the lug $f'$, bear against the side of the beam or bracket to hold the transmission in adjusted position. In a specially constructed power-table there will be no necessity for vertical adjustment of the transmission, but when the transmission is applied to an old table, as indicated in Figs. 4 and 5, then there should be provision for vertical adjustment. For this purpose, as shown in Figs. 4 and 5, the bolt $f^3$ is eccentrically placed in a cylindrical bearing $f^5$ which is seated in the bracket $a^2$, and is retained therein by a washer $f^7$ under the head of the bolt. Rotation of the cylinder $f^5$, when the bolt $f^3$ is loosened, permits the desired vertical adjustment of the transmission to be effected.

Mounted on the transmission shaft $d$ within the casing, and held by a spline or feather $g'$ so as to rotate with the shaft, but to be free for longitudinal movement thereon, is a male, cone clutch member $g$, the hub $g^2$ of which is provided with a circumferential groove $g^3$. The periphery of the clutch member may be provided with cork or other suitable friction material $g^4$. The female clutch member $h$, which also constitutes the brake disk, is adapted for coöperation with the male clutch member $g$ and is formed or fixed on the end of a sleeve $h'$ which has a bearing in the hub $f^6$ of the casing member $f$, and has secured to it, outside of the casing, a drive pulley $i$, the hub of which is split and provided with clamping screws $i'$ to permit the drive pulley to be removed and replaced readily.

To effect the opening and closing of the clutch and the application and release of the brake, there is mounted in suitable bearings in the case member $f$ a transverse shaft $k$, to which is secured, within the casing, a fork $k'$ to engage the grooved hub of the clutch member $g$, and a brake arm $k^2$ for coöperation with the brake surface of the clutch member $h$. To the end of the shaft $k$, outside of the casing, is secured an operating arm $k^3$, to one end of which is connected the operating rod $k^4$, which may extend to a pedal lever not shown, while to the other end is connected a tension spring $k^5$, the effect of which, when not opposed by the rod $k^4$, is to open the clutch and apply the brake. That portion of the operating arm $k^3$ to which the spring is applied is provided with a series of holes $k^6$ for engagement with the spring $k^5$, while the casing is provided with a longitudinal rib $k^7$, also having a series of holes for engagement with the spring, so that the tension of the spring can at any time be adjusted readily to compensate for relaxation of the spring or for changes in the driving pulley or whenever such change of tension may be desirable.

To provide for constant circulation of the lubricating oil within the casing and its proper application wherever it is required, the inner face of the casing member $e$ is provided, above the bearing, with an oil receiving recess $e^2$, from which oil is conducted by channels $e^3$ to the bearing surface for the transmission shaft $d$, and is also provided with an annular recess $e^4$ to receive an oil ring $d'$ and to receive the oil which traverses the bearing and is thrown off by the oil ring and to return it by a channel $e^5$ to the interior of the casing. In like manner the hub $f^6$ is provided with an oil receiving recess $f^8$, channels $f^9$, an oil ring $f^{10}$ and a channel $f^{11}$ for the distribution of oil to the bearing between the hub and the sleeve $h'$ and its return to the interior of the casing.

The dress guard $m$ is secured in place so as to be removable readily, for the purpose of permitting easy access to the drive pulley $i$. For this purpose the dress guard $m$ is provided with a split hub $m'$ and clamping screw $m^2$, by which it can be readily applied to and removed from the guard sleeve $b'$, and is also provided, as shown particularly in Figs. 2 and 3, with a lug $m^3$ which enters a shallow recess $f^{12}$ formed therefor in the casing $f$, and is secured in place by a bolt $m^4$.

Without further description the construction, application and operation of the improved transmission will be understood and it will be seen that its construction is such as to permit all of the advantages pointed out hereinbefore to be realized fully. It will also be understood that various changes in details of construction and arrangement may be made, to suit different conditions of use, without departing from the spirit of the invention.

I claim as my invention:—

1. A power-table transmission comprising a transmission shaft adapted to be coupled to the adjacent drive shaft, an inclosed casing through which the transmission shaft is extended, a clutch member slidably secured to the shaft within the casing, a second clutch member within the casing forming a brake disk and having a sleeve extended outwardly through the casing, a drive pulley secured to the sleeve outside the casing, a clutch arm and a brake arm secured together for common operation and mounted within the casing, and means to actuate the clutch arm and the brake arm from outside the casing.

2. A power-table transmission comprising a shaft, an inclosed casing through which the shaft is extended, a clutch member slidably secured to the shaft within the casing, a second clutch member forming a brake disk and having a sleeve extended outwardly through the casing to receive the drive pulley, a rock shaft mounted in the casing, a brake arm and a clutch arm secured to the rock shaft, and an operating arm secured to the rock shaft outside the casing.

3. A power-table transmission comprising a shaft, a casing through which the shaft is extended, a clutch member slidably secured to the shaft within the casing, a second clutch member within the casing forming a brake disk and having a sleeve extended outwardly through the casing to receive the drive pulley, a rock shaft mounted transversely in the casing, a brake arm and a clutch arm secured to said shaft within the casing, an operating arm secured to the rock shaft outside the casing, and a tension spring connected to the operating arm.

4. A power-table transmission comprising a shaft, a casing through which the shaft is extended, a clutch member slidably secured to the shaft within the casing, a second clutch member within the casing forming a brake disk and having a sleeve extended outwardly through the casing to receive the drive pulley, a rock shaft mounted transversely in the casing, a brake arm and a clutch arm secured to said shaft within the casing, an operating arm secured to the rock shaft outside the casing, and a tension spring connected to the operating arm, the operating arm being provided with means whereby the tension spring can be connected thereto at different points to vary the tension of the spring.

5. A power-table transmission forming a unitary structure and comprising a casing, a sectional transmission shaft extended through the casing, clutch members within the casing, one of the clutch members being engaged with the shaft and the other clutch member having a drive pulley connected therewith outside the casing, and means mounted within the casing but operable from outside the casing for opening and closing the clutch and applying and releasing a brake to and from one of the clutch members, the casing having a lug with a bolt for securing it to the power-table, and a dress guard secured to the casing and inclosing the drive pulley.

6. A power-table transmission forming a unitary structure and comprising a casing, a sectional transmission shaft extended through the casing, clutch members within the casing, one of the clutch members being engaged with the shaft and the other clutch member having a drive pulley connected therewith outside the casing, and means mounted within the casing but operable from outside the casing for opening and closing the clutch and applying and releasing a brake to and from one of the clutch members, the casing having a lug with a bolt for securing it to the power-table, and a dress guard secured to the casing and inclosing the drive pulley, the dress guard having a split hub adapted to be clamped upon an adjacent guard sleeve.

This specification signed this twentieth day of July, A. D. 1915.

GEORGE E. MOLYNEUX.